(12) United States Patent
Heise et al.

(10) Patent No.: US 6,956,470 B1
(45) Date of Patent: Oct. 18, 2005

(54) METHOD AND DEVICE FOR ACTIVELY ASSISTING A MOTOR VEHICLE DRIVER IN A MOTOR VEHICLE

(75) Inventors: Gilbert Heise, Wolfsburg (DE); Susanne Dirksen, Wolfsburg (DE); Gerald Busse, Hildesheim (DE); Joerg Lilienthal, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 205 days.

(21) Appl. No.: 10/070,074

(22) PCT Filed: Aug. 24, 2000

(86) PCT No.: PCT/EP00/08250

§ 371 (c)(1),
(2), (4) Date: Jul. 1, 2002

(87) PCT Pub. No.: WO01/17812

PCT Pub. Date: Mar. 15, 2001

(30) Foreign Application Priority Data

Sep. 3, 1999 (DE) ................................ 199 41 973

(51) Int. Cl.[7] .............................................. B60Q 1/00

(52) U.S. Cl. ..................... 340/438; 340/461; 340/933; 345/173

(58) Field of Search ................................ 340/438, 933, 340/426.15, 461, 10.6; 701/1, 29; 345/173, 345/349

(56) References Cited

U.S. PATENT DOCUMENTS

| | | | |
|---|---|---|---|
| 5,006,829 A * | 4/1991 | Miyamoto et al. | 340/459 |
| 5,191,532 A * | 3/1993 | Moroto et al. | 701/201 |
| 5,239,700 A | 8/1993 | Guenther et al. | 455/158.4 |
| 5,469,150 A | 11/1995 | Sitte | 340/825.07 |
| 5,627,547 A * | 5/1997 | Ramaswamy et al. | 342/357.08 |
| 5,694,116 A * | 12/1997 | Kojima | 340/576 |
| 5,963,148 A * | 10/1999 | Sekine et al. | 340/905 |
| 6,151,539 A * | 11/2000 | Bergholz et al. | 701/25 |
| 6,373,472 B1 * | 4/2002 | Palalau et al. | 345/173 |

FOREIGN PATENT DOCUMENTS

| | | |
|---|---|---|
| DE | 196 38 324 | 11/1997 |
| DE | 197 00 353 | 7/1998 |
| DE | 197 15 325 | 10/1998 |
| DE | 198 07 410 | 8/1999 |
| EP | 0 366 132 | 5/1990 |
| EP | 0 701 926 | 3/1996 |
| EP | 0 756 153 | 1/1997 |
| WO | WO 97/13657 | 4/1997 |
| WO | WO 99/28145 | 6/1999 |

OTHER PUBLICATIONS

Berlin RCM 303 A Bedienungsanleitung, pp. 11 to 14.

* cited by examiner

*Primary Examiner*—Phung T. Nguyen
(74) *Attorney, Agent, or Firm*—Kenyon & Kenyon

(57) ABSTRACT

In a method and device for actively assisting a vehicle driver in a motor vehicle by at least one control device and a data entry and display unit, the control device may access data of vehicle state-relevant sensors and of control devices and/or comfort control devices and/or internal or external databases.

15 Claims, 6 Drawing Sheets

METHOD AND DEVICE FOR ACTIVELY ASSISTING A MOTOR VEHICLE DRIVER IN A MOTOR VEHICLE

FIELD OF THE INVENTION

The present invention relates to a method and a device for implementing the method of actively assisting a motor vehicle driver in a motor vehicle.

BACKGROUND INFORMATION

Motor vehicles represent an overall system, which is becoming increasingly complex and, on one hand, offers a motor vehicle driver more and more comfort options and, on the other hand, is provided with an increasing number of safety-related systems. However, these safety-related systems must be monitored with regard to their functionality. In the case of a defect or a condition that is critical for the vehicle, a motor vehicle driver often does not know how he or she should react to such an error message indicated, for example, by a lit-up LED. In addition, it is difficult for most motor vehicle drivers to remember how to correctly operate all of the comfort systems, such as navigation, engine-independent heating systems, air conditioning, seat adjusters, mirror adjusting systems, telephone, audio, etc. This results in a multitude of comfort options, which would otherwise be used, not being used at all. In addition, the existing displays only show the motor vehicle driver the actual states, such as "the tank is empty", "inspection interval elapsed", or "for safety reasons, television only during standstill".

Therefore, it is an object of the present invention to provide a method and a device for actively assisting a motor vehicle driver in a motor vehicle, which prevent the problems described above.

SUMMARY

To this end, the control unit and an input and display unit automatically assist in the communication between the motor vehicle driver and the vehicle. In order to assist the motor vehicle driver, he or she is offered context—and/or preference-sensitive input options, which are automatically implemented after being selected by the motor vehicle driver.

In an example embodiment of the present invention, a control unit monitors the conditions of the vehicle and displays these on a display unit, together with possible actions. The action selected by the motor vehicle driver is then automatically executed by the device. If the control unit detects, for example, that the engine temperature has exceeded its permissible value, then this is automatically represented on the display unit. In addition, the possible actions such as "shut off engine", "call nearest garage", or "ignore" are represented on the display unit. If the motor vehicle driver selects the action "shut off engine", then the device automatically switches off the engine. If, however, the motor vehicle driver selects the action "call nearest garage", then the device uses the data of a navigation device to search for the next service station, and uses a car-phone system to automatically dial the number of the service station. Therefore, the method is not only used to display the critical conditions to the motor vehicle driver, but also to display the appropriate countermeasures, which are then actively supported, as well. To this end, the individual countermeasures may be stored in a situation-specific manner in a memory assigned to the control unit. Examples of other critical vehicle conditions include the engine-oil level.

The motor vehicle driver may also be actively assisted in the adjustment of comfort components. For this purpose, the control unit is connected to the corresponding comfort devices. After the motor vehicle driver has manually activated the method, the possible comfort systems are initially represented on the display unit, from which the motor vehicle driver may then select the desired comfort components. In addition, it should be noted that, in this case, manual activation is to be understood as the opposite of automatic activation and therefore includes activation by voice command, as well. After the motor vehicle driver has selected the desired comfort components, the display unit displays which changes may be made and how they may be performed. In this context, the display occurs in a context-sensitive manner, i.e., only information relevant for the adjustments is displayed.

If the display unit is configured as a touch screen, then the corresponding control elements may be ordered in a context-sensitive manner and displayed on the display unit.

The motor vehicle driver may receive further, active assistance from recommendations such as eating, resting, refueling, parking, or spending the night. To this end, the motor vehicle driver manually activates the method again and selects from a suggestion list the recommendations he would like to receive. Access to the data of a navigation system allows a list of possible suggestions to be compiled, driver preferences possibly being considered. In the individual recommendations, the motor vehicle driver may have details displayed for him and, after selecting a recommendation, he may be navigated to what is recommended or make an order, in which case the number may be automatically dialed.

The individual methods may also be combined, i.e., one may simultaneously intervene in comfort components and vehicle-condition components. If, for example, the motor vehicle driver selects a television mounted in the vehicle, while driving, then the driver is informed, on one hand, that this is not permissible while driving. In addition, the warning is immediately followed by an inquiry as to whether a possibility for parking may be sought after. If the motor vehicle driver answers this in the affirmative, then the system searches for the next parking possibility with the aid of a navigation system, and navigates the motor vehicle driver to it. Preparatory adjustments, such as the selection of a station, may already be checked and performed parallelly to navigating. If the motor vehicle was navigated to the parking spot, the motor vehicle driver is asked if the engine may be shut off, which may then be automatically executed by the system.

The present invention is explained below in detail, using an example embodiment.

DETAILED DESCRIPTION

Figure 2:
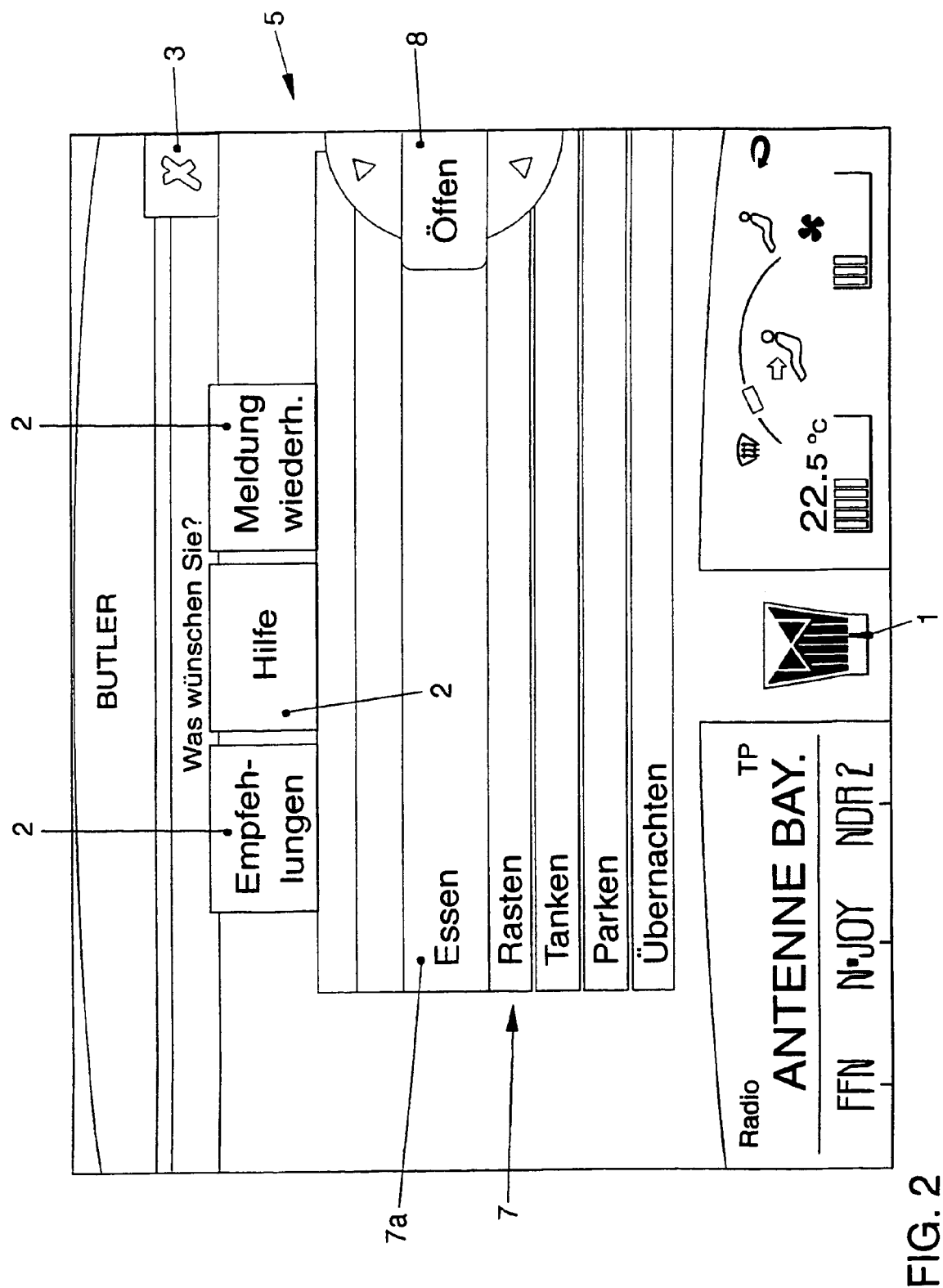
FIG. 2 is a schematic view of a display on the display unit, after the driver has input a request for recommendations.

The method for actively assisting a motor vehicle driver in a motor vehicle is assigned an activation field 1, which may be arranged at the same position on display unit 5, which takes the form of a touch screen. If this activation field 1 is activated, then a control unit changes the current display on display unit 5 and generates a first input menu 6 on display unit 5. This input menu 6 includes a marking indicating that the method is activated, in which the name of the function, for example "BUTLER", is made visible, the upper edge of input menu 6 also being rounded off. Furthermore, input menu 6 includes three input fields 2, on which the selection options are alphanumerically displayed. In this context, the user may select among the input options "recommendations", "help", and "repeat status message", input fields 2 being configured as touch fields. Alternatively, or in addition, the input may be accomplished by voice command and/or using a bidirectional, rotary pressure transducer, which, for example, is described in European Published Patent Application No. 0 366 132. If input option 2a, "recommendations", is selected, the control unit generates a display illustrated in FIG. 2.

Figure 1:
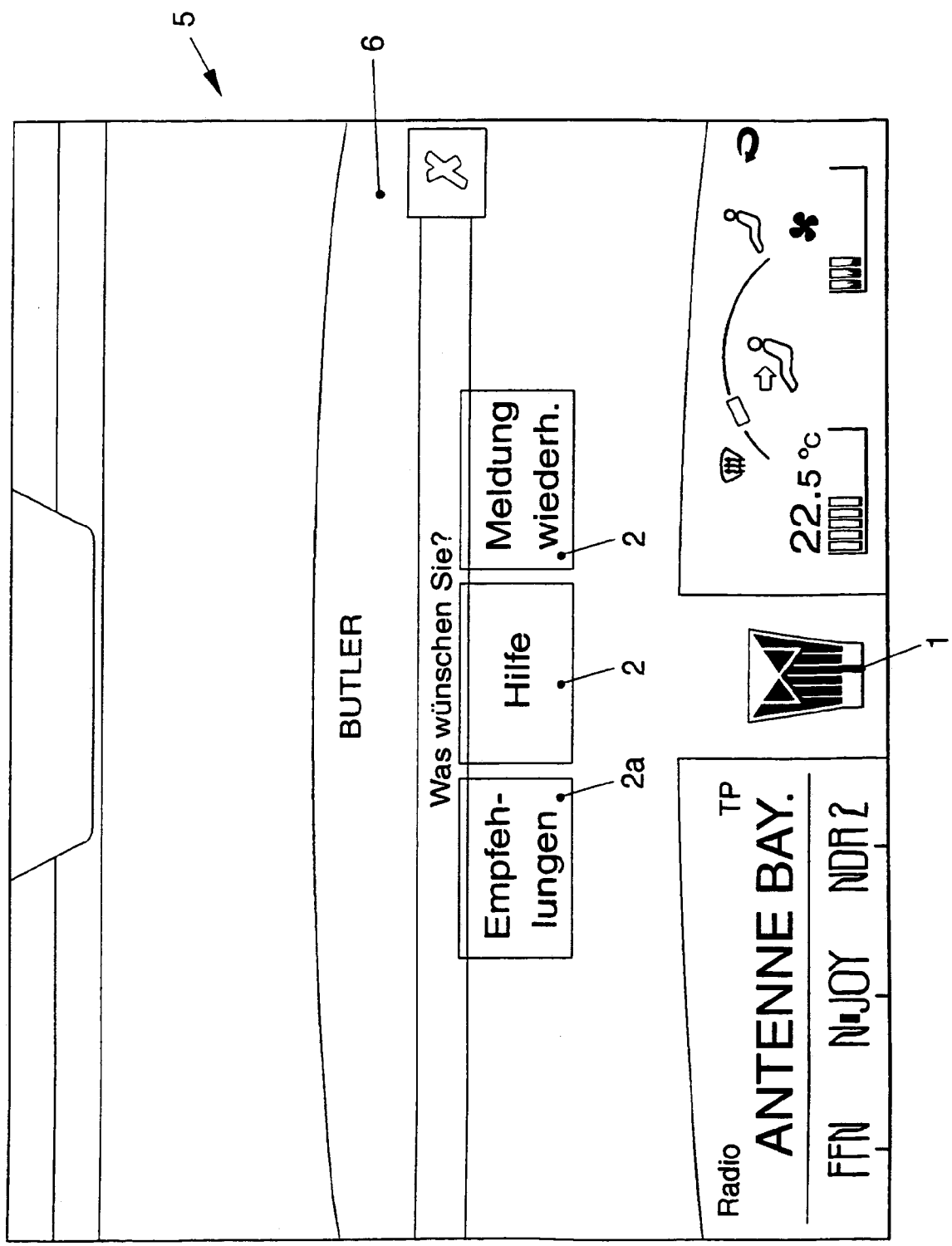
FIG. 1 is a schematic view of a display on a display unit, after the method has been activated.
Figure 3:
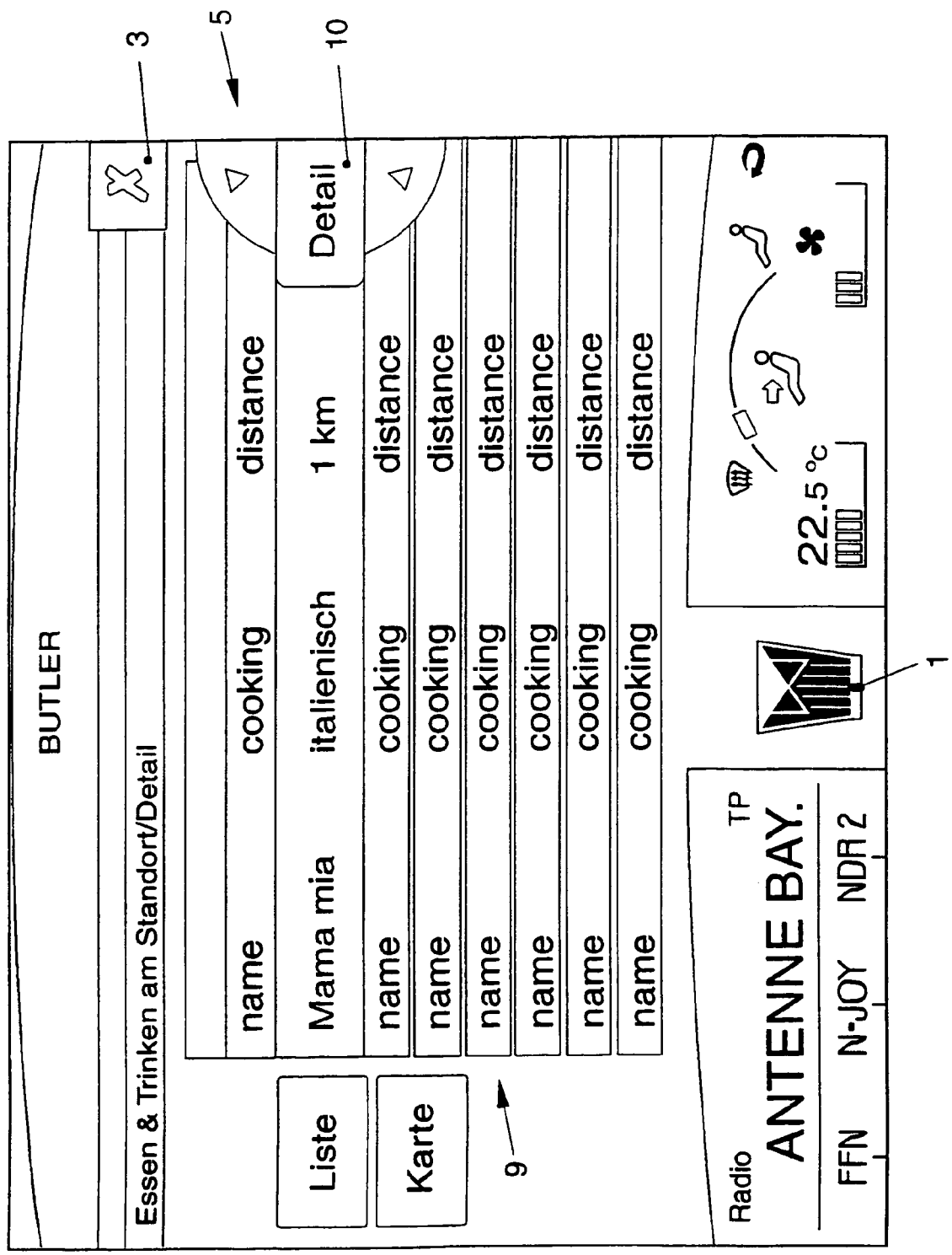
FIG. 3 is a schematic view of a display of a hit list.
Figure 4:
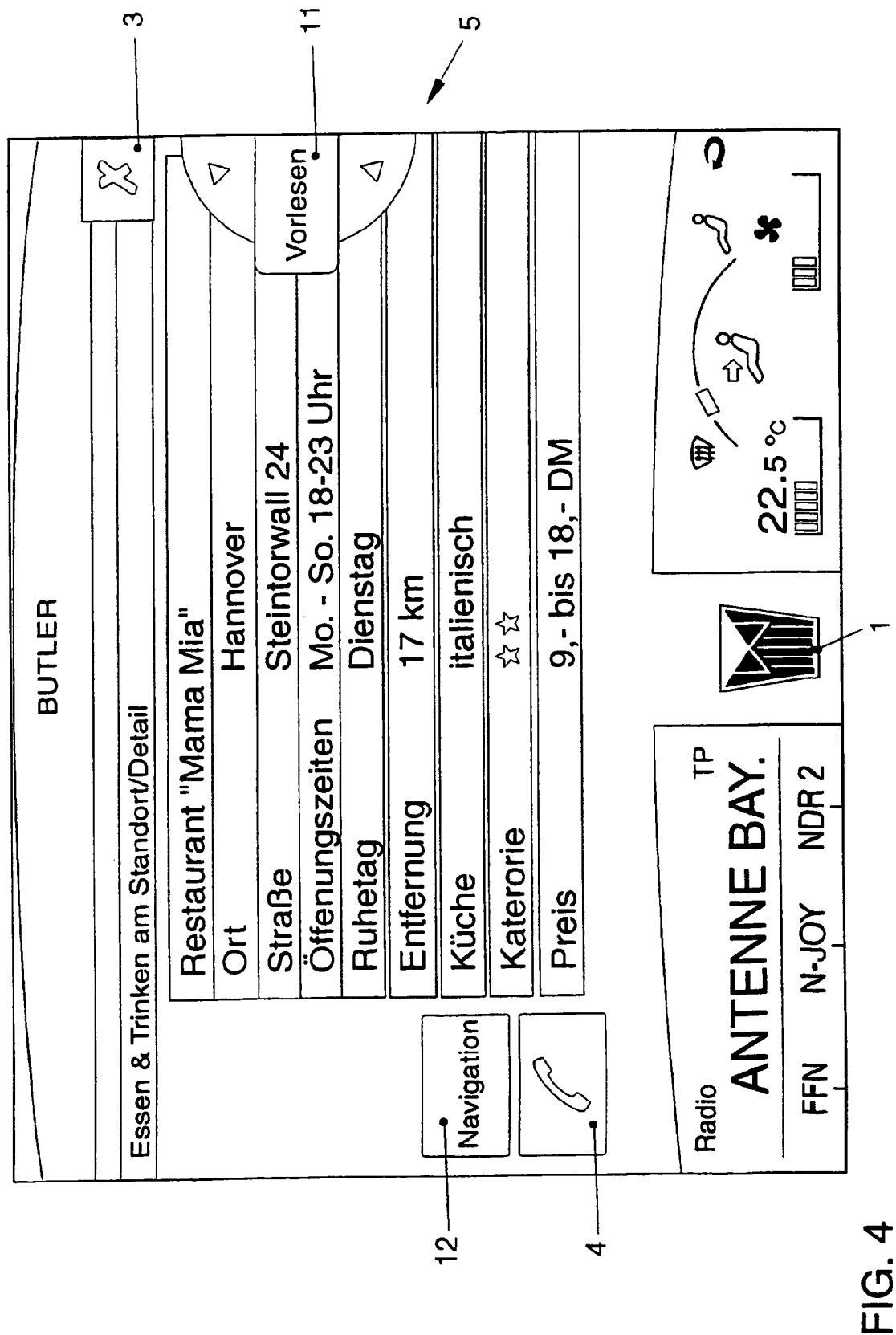
FIG. 4 is a schematic view of a detailed display of a hit.
Figure 5:
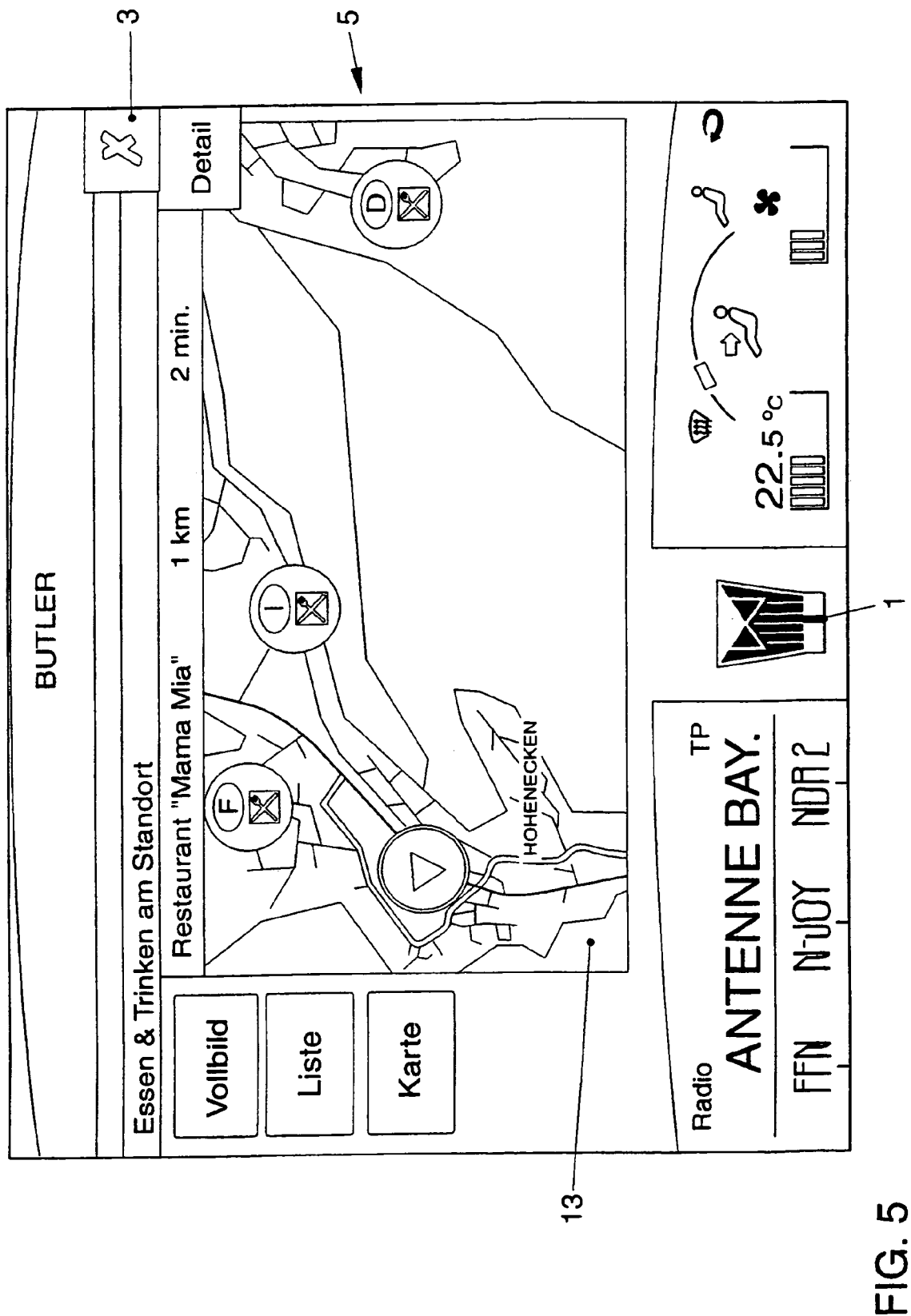
FIG. 5 is a schematic view of a display of the hits on a digital map.

In this case, input menu 6 illustrated in FIG. 1 has been moved up on display unit 5. A menu 7 of the areas, for which the method may give the user recommendations, in this case "eating", "resting", "refueling", "parking", and "lodging", is then displayed under the input menu. The fields of menu 7 are configured as touch fields, as are input fields 2. If the user now selects the field, "eating", this field 7a is displayed in color or in an optically highlighted manner. In addition, the selected field is assigned a touch-sensitive input field 8, "open", by which detailed information is displayable. However, the user may change to another field or another input option by touch, or discontinue the method by touching "closing field" 3. After input field 8, "open", is touched, the control unit generates a suggestion list 9, which is illustrated in FIG. 3. To generate this suggestion list 9, the control unit accesses the database of a navigation system, in order to determine the current position of the motor vehicle. Using this current position as a starting point, the control unit searches through an internal and/or external restaurant database. In this context, the control unit selects restaurants located within a certain area around the current position, additional driver preferences, such as "no Japanese food", being considered. If the user would like to obtain details on a restaurant, this restaurant is selected in suggestion list 9, and inserted field 10, "detail", is activated. An example detailed display is illustrated in FIG. 4. If desired, the user may have the menu read out by activating input field 11, "read out". The activation of input field 4 automatically establishes a telephone connection to the restaurant, in order, for example, to reserve a table. But if the user would like to receive data for navigating to the restaurant, then, by activating input field 12, "navigation", a digital map 13 having route guidance is displayed on display unit 5 as illustrated in FIG. 5, and/or the guidance system is activated.

Figure 6:
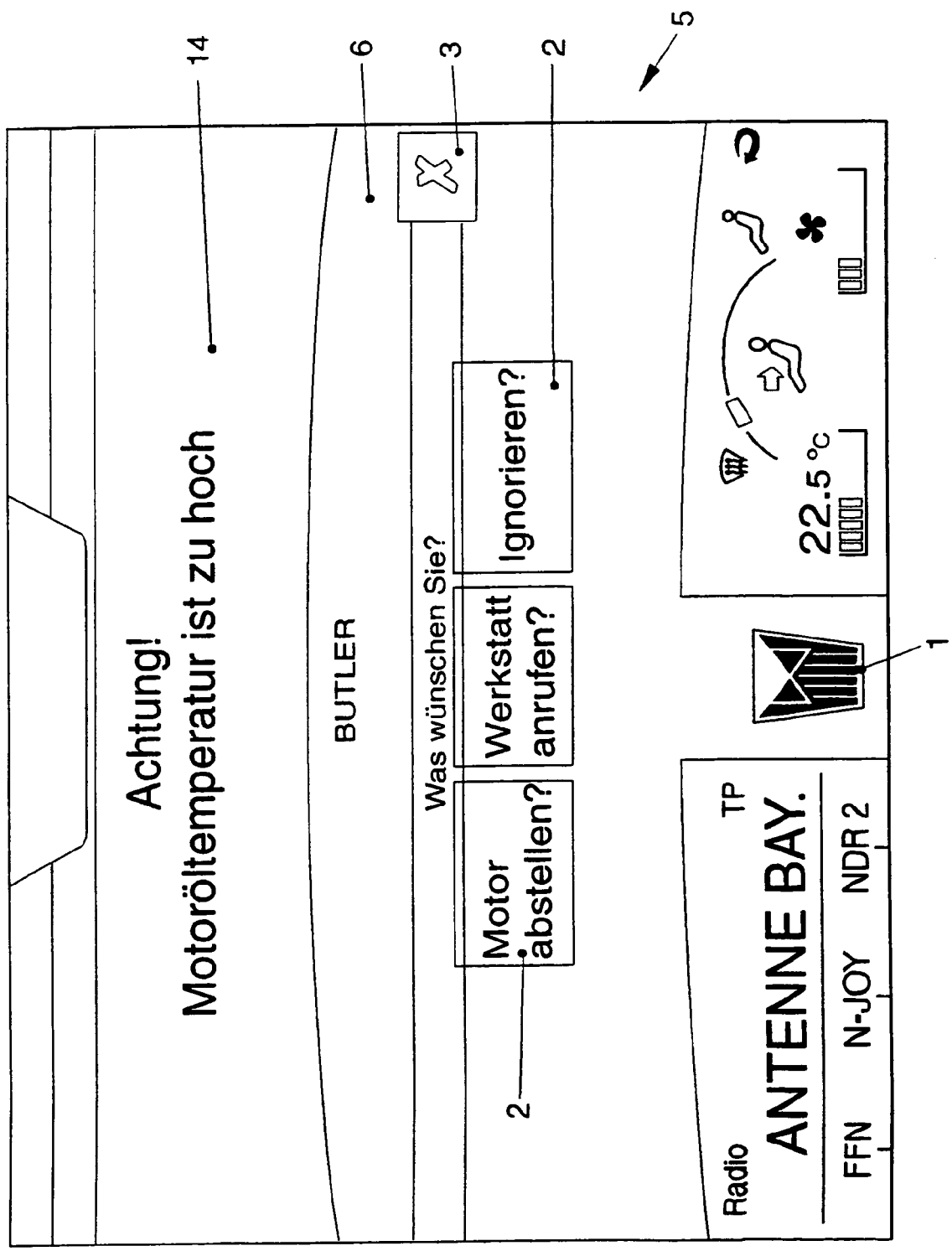
FIG. 6 is a schematic view of a display of an automatically displayed, critical vehicle condition.

Illustrated in FIG. 6 is a display of an automatically displayed warning message 14 for a critical condition of the vehicle. The example illustrated is the increased temperature of the engine oil. To this end, the control unit or sensory system responsible for the engine-oil temperature transmits a warning message to the control unit controlling display unit 5. As a result, the control unit generates a corresponding warning message 14 and displays it on display unit 5 in an optically highlighted manner. In order to perceive it in an improved manner, the warning message may be emphasized in color and/or using additional pictographs. Furthermore, additional acoustic and/or haptic warning instructions are also possible. At the same time, the control unit activates the method for active assistance, so that input menu 6 is automatically displayed with assigned input fields 2. Possibilities for action, such as how one may react to the represented, critical vehicle condition, are offered to the driver on these input fields 2. In this case, the motor vehicle driver may select among the options "shut off engine", "call garage", or "ignore". If the motor vehicle driver selects input field 2, "shut off engine", then the control unit automatically switches off the engine. In so doing, the event may be delayed in time, in order that the motor vehicle driver is able to shut off the motor vehicle at a suitable location. However, if the motor vehicle driver selects input field 2, "call garage", then the control unit automatically calls the nearest garage. When input field 2, "ignore", is selected, warning message 14 is erased accordingly.

What is claimed is:

1. A method for actively assisting a motor vehicle driver in a motor vehicle using at least one control unit and an input and output unit, the control unit configured to access data of sensors and control units relevant to a condition of the motor vehicle and to transmit control commands to the control units and devices configured for external communication, comprising the steps of:

detecting a critical vehicle condition by the control unit by evaluating the data of the sensors and the control units;

generating a list of possible actions for the motor vehicle driver in response to the critical vehicle condition detected in the detecting step;

displaying the detected critical vehicle condition and the list of possible actions of the motor vehicle driver on a display unit of the input and output unit; and executing an action selected by the motor vehicle driver using the control unit.

2. The method according to claim 1, wherein the critical vehicle condition includes an engine temperature.

3. The method according to claim 1, wherein the critical vehicle condition includes an engine-oil level.

4. The method according to claim 1, wherein the list of possible actions includes at least one of shutting off the engine, calling a garage, and ignoring.

5. A method for actively assisting a motor vehicle driver in a motor vehicle using at least one control unit and an input and output unit, the control unit configured to access data of comfort control units and to transmit control commands to the comfort control units, comprising the steps of:

manually activating the method by the motor vehicle driver;

displaying an input prompt on a display unit of the input and output unit relating to which comfort setting should be changed;

context-sensitive and preference-sensitive compiling of at least one of operational settings and control elements relevant to the input prompt on the display unit using the control unit; and executing input control commands.

6. The method according to claim 5, wherein the display unit includes a touch-sensitive screen.

7. A method for actively assisting a motor vehicle driver in a motor vehicle using at least one control unit and an input and output unit, the control unit configured to access at least one of an internal database and an external database, comprising the steps of:

manually activating the method by the motor vehicle driver;

displaying a list of possible recommendations on a display unit of the input and output unit;

executing a context-sensitive and a preference-sensitive interrogation dialog to ascertain a driver command;

displaying possible actions performable in response to the ascertained driver command; and executing an action selected by the motor vehicle driver using the control unit.

8. A device for actively assisting a motor vehicle driver in a motor vehicle, comprising:

at least one control unit configured to evaluate detected conditions critical to the motor vehicle; and an input and output unit configured to detect and display conditions critical to the motor vehicle using the control unit, to generate and display a list of possible actions of the motor vehicle driver in response to the detected conditions critical to the motor vehicle as an input option with the condition critical to the motor vehicle;

wherein the control unit is configured to perform a selected input option.

9. The device according to claim 8, wherein the control unit is connected to at least one other control unit of the motor vehicle by a CAN bus.

10. The device according to claim 8, wherein the display unit includes a touch screen.

11. The device according to claim 8, wherein the input and output unit includes an input device, the input device including at least one of a voice-recognition unit and a bidirectional, rotary pressure transducer.

12. A device for actively assisting a motor vehicle driver in a vehicle, comprising:

at least one control unit configured to acquire data of comfort control units and to control the comfort control units; and an input and output unit including a display unit configured to display input prompts for selecting a comfort setting using the control unit, the display unit configured to display at least one of operational settings and control elements relative to selected comfort settings in a context-sensitive and preference-sensitive manner;

wherein the control unit is configured to execute input control commands for the at least one of the operational settings and the control elements.

13. The device according to claim 12, wherein the control unit is connected to at least one other control unit of the motor vehicle by a CAN bus.

14. The device according to claim 12, wherein the display unit includes a touch screen.

15. The device according to claim 12, wherein the input and output unit includes an input device, the input device including at least one of a voice-recognition unit and a bidirectional, rotary pressure transducer.

* * * * *